United States Patent [19]

Yamamoto et al.

[11] Patent Number: 5,082,496
[45] Date of Patent: Jan. 21, 1992

[54] INK, AND INK-JET RECORDING METHOD AND APPARATUS EMPLOYING THE INK

[75] Inventors: Takao Yamamoto, Isehara; Tsuyoshi Eida, Yokohama; Mayumi Yamamoto, Tokyo, all of Japan

[73] Assignee: Canon Kabushiki Kaisha, Tokyo, Japan

[21] Appl. No.: 651,203

[22] Filed: Feb. 6, 1991

[30] Foreign Application Priority Data

Feb. 9, 1990 [JP] Japan ................................. 2-30663
Dec. 28, 1990 [JP] Japan ................................. 2-408934

[51] Int. Cl.$^5$ .............................................. C09D 11/02
[52] U.S. Cl. ............................................ 106/22; 106/20
[58] Field of Search ............. 106/20, 22; 534/667, 534/669, 680, 685, 687, 810, 811, 812, 815, 809

[56] References Cited

U.S. PATENT DOCUMENTS

| | | | |
|---|---|---|---|
| 4,279,814 | 7/1981 | Smith | 534/810 |
| 4,508,570 | 4/1985 | Fujii et al. | 106/20 |
| 4,670,548 | 6/1987 | Westphal | 534/809 |
| 4,804,411 | 2/1989 | Eida et al. | 534/815 |

FOREIGN PATENT DOCUMENTS

| | | |
|---|---|---|
| 59-93766 | 5/1984 | Japan . |
| 59-93768 | 5/1984 | Japan . |
| 62-010274 | 3/1987 | Japan . |
| 1-135880 | 5/1989 | Japan . |
| 1-193375 | 8/1989 | Japan . |

OTHER PUBLICATIONS

Patent Abstracts of Japan, vol. 8, No. 178, Aug. 16, 1984, with respect to Japanese Patent Document No. 59-75966, (Apr. 28, 1984).

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

An ink including a recording agent and a liquid medium for dissolution or dispersion thereof, the recording agent being a compound represented by the general formula $$A-N=N- \text{(naphthol-SO}_3M\text{)} -N=N- \text{(aryl-}R^1R^2\text{)} -N=N- \text{(aryl-}R^3R^4R^5\text{)} \quad (I)$$

wherein $R^1$ and $R^2$ are respectively a radical selected from the group of lower alkyl, lower alkoxy, —NHCOCH$_3$, —COOM, and —SO$_3$M; $R^3$, $R^4$, and $R^5$ are respectively a radical selected from the group of hydrogen, hydroxyl, lower alkyl, lower alkoxy, amino, —SO$_3$M, and —COOM; A is naphthalene with $R^6$ and $(SO_3M)_m$ or naphthalene with OH, SO$_3$M, and $(SO_3M)_n$, $R^7$;

$R^6$ and $R^7$ are respectively a radical selected from the group of hydrogen, hydroxyl, and lower alkoxy; m is 1 or 2; n is 0 or 1; and M is alkali metal or ammonium.

5 Claims, 3 Drawing Sheets

INK, AND INK-JET RECORDING METHOD AND APPARATUS EMPLOYING THE INK

BACKGROUND OF THE INVENTION

1. Field of the Invention

The present invention relates to an ink, an ink-jet recording method employing the ink, and an apparatus employing the ink. More particularly, the present invention relates to a recording liquid which provides high density and water resistance of printed letters on non-coated paper such as wood-free paper, paper for copying, bond paper, paper for reporting, and the like, and which provides improved indoor discoloration of an image recorded on coated paper having an image-receiving layer thereon composed of a binder and a pigment. The present invention also relates to an ink-jet recording method, an ink-jet recording unit, an ink-jet recording apparatus, and an ink cartridge.

2. Related Background Art

Heretofore, aqueous inks having a water-soluble dye dissolved in an aqueous medium have been used for ink-jet recording. The inks for such a use are required to have properties as below:

(1) providing sufficient density of images,
(2) having satisfactory drying property on recording mediums,
(3) causing little feathering or running of images,
(4) causing no flowing-out of the recorded images when brought into contact with water, alcohol, or the like, or allowing satisfactory decipherment even when some flowing out occurs (water-resistance),
(5) providing high light-fastness of recorded images,
(6) causing no clogging of a tip of a pen or a nozzle,
(7) causing no inconvenience in printed images such as blurring and scratching in continuous recording or at the re-start of recording after a long term of intermission of the recording (ejection stability),
(8) being stable during storage,
(9) causing no problem on contact with a constituting member of a recording means on use,
(10) giving no hazard to an operator,
and so forth.

Furthermore, in an ink-jet recording system, utilizing thermal energy, the property below is required in addition to the above requirements:

(11) having high heat resistance, and giving no adverse influence to a thermal energy-generating means.

As a specific example of the dye, C.I. Food Black 2 is mainly used in ink-jet recording for both mono-color and full-color images (see Japanese Patent Application Laid-Open Nos. 59-93766, and 59-93768).

An ink using C.I. Food Black 2 is satisfactory in density of recorded images, but still involves problems on light-fastness and water-resistance of recorded images: such that the black color turns brown on prolonged light exposure or on posting-up of printed matters in proximity to a copying machine, resulting in remarkable deterioration of the image quality, and difficulty in decipherment in test of water-spilling.

An ink is disclosed which has ejection stability, water resistance of images, and other properties improved by introducing at least one specific structural unit into a dye structure in Japanese Patent Application Laid-Open No. 1-135880. Further, a recording liquid of black color is disclosed, in Japanese Patent Application Laid-Open No. 1-193375, which has high affinity to recording mediums, and superior in fixability and water-resistance, giving satisfactory quality of printed letters on an ordinary paper. Furthermore, a recording liquid is disclosed which is improved in ejection stability, and light fastness of images in Japanese Patent Publication No. 62-010274.

The ink is required firstly to have suitability for an employed recording system, and secondly is required to give satisfactory properties of printed matters such as quality and fastness of the images. However, it is considerably difficult to satisfy simultaneously all of the aforementioned various requirements on performances, as understood from the prior art disclosures cited above.

The quality of the printed letters mostly depends on a liquid medium of the ink, although it depends secondarily on properties of the dye itself.

The fastness of the printed matter is directly influenced by the dye properties. In particular, light-fastness is the most important of the fastnesses, and improvement of the light-fastness has been tried as described above.

Another problem is discoloration or color change which has not been noticed but has come to be noticed lately as a consequence of technical progress. The discoloration is especially serious in black ink which is used in a large quantity. In full color images, the image quality deteriorates rapidly by the discoloration.

The discoloration proceeds indoors also without direct sunlight illumination. The discoloration further depends on the kind of a recording medium for forming images thereon, being remarkable on paper containing silica or the like as a pigment. The widely used C.I. Food Black 2 is not free from this problem.

Dyes having satisfactory light-fastness have been sought in order to avoid the disadvantage of C.I. Food Black 2. Consequently, dyes have been found that are satisfactory for use on ordinary paper. However, even the ink causing fewer problems on ordinary paper discolors significantly on coated paper that has an ink-receiving layer formed on a substrate and containing a pigment and a binder for the purpose of improving image quality such as color-developing property of the dyes, sharpness, and resolution. Thus the problem is not solved by merely employing a light-fast dye.

SUMMARY OF THE INVENTION

An object of the present invention is to provide a black ink which has the above generally required properties and provides no discoloration of the image even on coated paper.

Another object of the present invention is to provide an ink-jet recording method and an apparatus employing the ink.

According to an aspect of the present invention, there is provided an ink containing a recording agent and a liquid medium for dissolution or dispersion thereof, the recording agent being a compound represented by the general formula

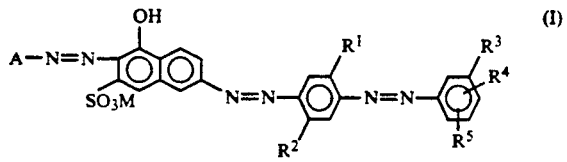

wherein $R^1$ and $R^2$ are respectively a radical selected from the group of lower alkyl, lower alkoxy, —NHCOCH$_3$, —COOM, and —SO$_3$M; $R^3$, $R^4$, and $R^5$ are respectively a radical selected from the group of hydrogen, hydroxyl, lower alkyl, lower alkoxy, amino, —SO$_3$M, and —COOM; A is

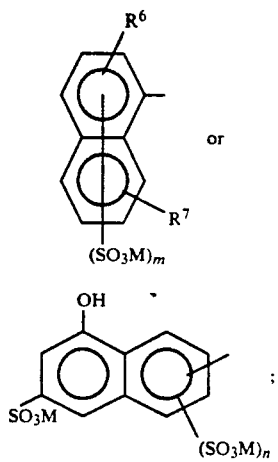

$R^6$ and $R^7$ are respectively a radical selected from the group of hydrogen, hydroxyl, and lower alkoxy; m is 1 or 2; n is 0 or 1; and M is alkali metal or ammonium.

According to another aspect of the present invention, there is provided an ink-jet recording method for conducting recording by ejecting ink droplets through an orifice onto a recording medium in response to a recording signal, wherein the abovementioned ink is employed.

According to still another aspect of the present invention, there is provided a recording unit having an ink container portion for holding an ink and a head portion for ejecting the ink in droplets, wherein the above-mentioned ink is employed.

According to a further aspect of the present invention, there is provided an ink cartridge having an ink container portion for holding an ink, wherein the above-mentioned ink is employed.

According to a still further aspect of the present invention, there is provided an ink-jet recording apparatus having an ink container portion for holding an ink and a head portion for ejecting the ink in droplets, wherein the above-mentioned ink is employed.

According to a still further aspect of the present invention, there is provided an ink-jet recording apparatus having a head portion for ejecting an ink in droplets, an ink cartridge having an ink container portion for holding the ink, and an ink-supplying portion for supplying the ink from the ink cartridge to the recording head, wherein the abovementioned ink is employed.

DESCRIPTION OF THE PREFERRED EMBODIMENTS

Figure 1A:
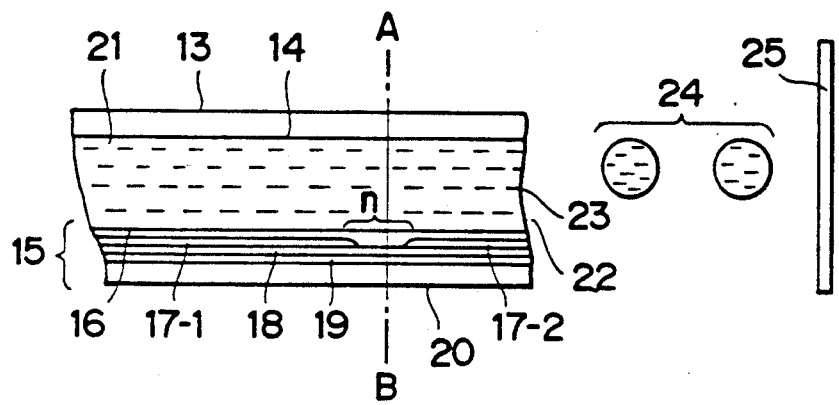
FIG. 1A and FIG. 1B are respectively a longitudinal cross-sectional view and a lateral cross-sectional view of a head portion of an ink-jet recording apparatus.

The present invention is described in more detail by reference to preferred embodiment.

The dyes employed in the present invention are generally a sodium salt of a water-solubility-imparting radical such as sulfonic acid radical or the like. The dye in the present invention, however, is not limited to the sodium salts. Salts of potassium, lithium, ammonium, and organic amines such as alcohol amine also give the similar effect, which are included in the present invention.

Specific examples of the dyes represented by the general formula (I) above are shown below.

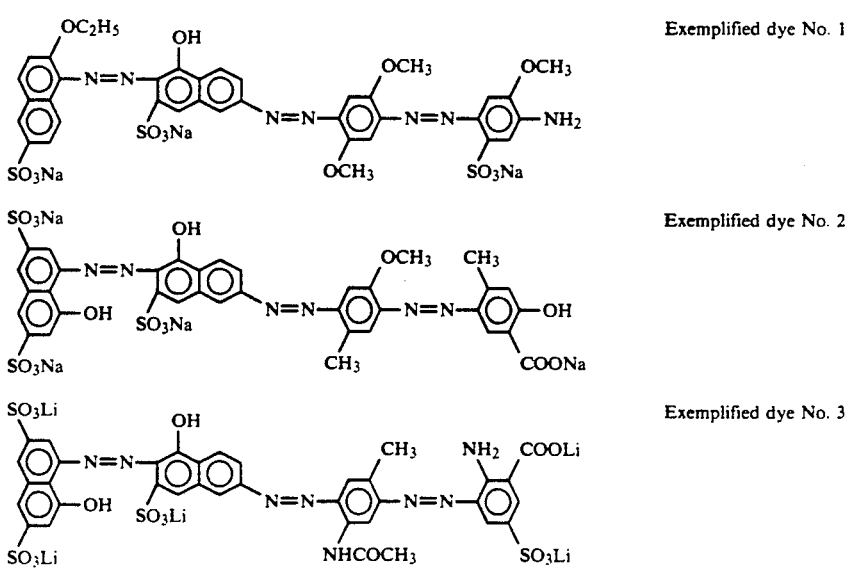

Exemplified dye No. 1

Exemplified dye No. 2

Exemplified dye No. 3

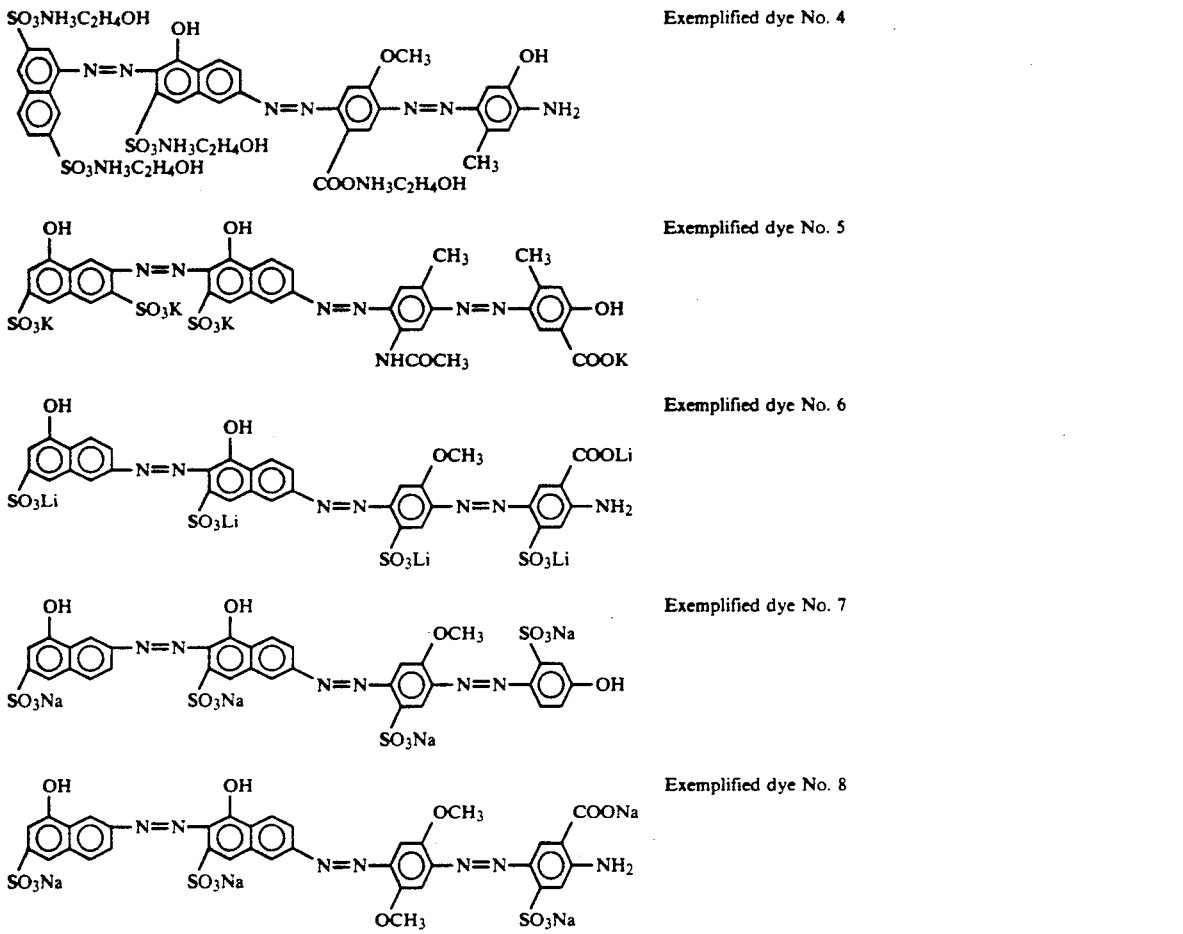

Exemplified dye No. 4

Exemplified dye No. 5

Exemplified dye No. 6

Exemplified dye No. 7

Exemplified dye No. 8

The dyes above are produced by a procedure below.

SYNTHESIS EXAMPLE 1

The Exemplified dye No. 1 is synthesized by a conventional manner as described in "Theory and Production in Dye Chemistry" written by Yutaka HOSODA as below.

1-amino-2-ethoxynaphthalene-6-sulfonic acid is diazotized in a conventional manner, and is coupled with J acid at a pH range of from 8 to 9. The product is further diazotized by sodium nitrite and is coupled with dimethoxyaniline. The resulting product is still further diazotized with sodium nitrite. The diazotized solution is added to a neutral aqueous solution of 1-amino-2-methoxybenzene-5-sulfonic acid, and stirred for 4 hours. The resulting dye is salted out by addition of sodium chloride and is collected by filtration. Impurities are eliminated from the product by repetition of dissolution, salting-out, and filtration. Thereafter the product is desalted and purified by means of an ultrafiltration apparatus (made by Sartorius GmbH) to obtain the Exemplified dye No. 1.

SYNTHESIS EXAMPLE 2

The sodium salt type of the Exemplified dye No. 4 is synthesized by repetition of diazotization and coupling reactions in a similar manner as in Synthesis example 1. Subsequently, the sulfonic moieties in the dye molecule are converted to free acid form by means of a strongly acidic ion exchange resin, and then the acid groups are neutralized with monoethanolamine to obtain the Exemplified dye No. 4.

The amount of the aforementioned dye to be used in the ink of the present invention is generally within the range of from 0.1 to 15% by weight, preferably 0.5 to 10% by weight, still more preferably from 0.5 to 6% by weight of the total weight of the ink, although the amount is not specially limited thereto.

A suitable aqueous medium for the ink of the present invention is water, or a mixed solvent composed of water and a water-soluble organic solvent.

The water to be used is preferably deionized water, and not ordinary water containing various ions.

Suitable water-soluble organic solvents to be mixed with water include alcohols having 1 to 5 carbons such as methyl alcohol, ethyl alcohol, n-propyl alcohol, isopropyl alcohol, n-butyl alcohol, sec-butyl alcohol, tert-butyl alcohol, isobutyl alcohol, n-pentanol, etc.; amides such as dimethylformamide, dimethylacetamide, etc.; ketones and ketoalcohols such as acetone, diacetone alcohol, etc.; cyclic ethers such as dioxane, etc.; polyalkylene glycols such as polyethylene glycol, polypropylene glycol, etc.; alkylene glycols having alkylene group of 2 to 6 carbons such as ethylene glycol, propylene glycol, butylene glycol, triethylene glycol, 1,2,6-hexane triol, thiodiglycol, hexylene glycol, diethylene glycol, etc.; glycerin; lower alkyl ethers of a polyhydric alcohol such as ethylene glycol monomethyl (or monoethyl) ether, diethylene glycol monomethyl (or monoethyl)

ether, triethylene glycol monomethyl (or monoethyl) ether, etc.; lower alkyl diethers of a polyhydric alcohol such as triethylene glycol dimethyl (or diethyl) ether, tetraethylene glycol dimethyl (or diethyl) ether, etc.; sulfolane, N-methyl-2-pyrrolidone, 1,3-dimethyl-2-imidazolidinone, and the like.

A suitable organic solvent is selected and used from the above solvents and the like. In particular, glycerin or a polyethylene oxide of a polymerization degree of 3 to 6 is preferable for prevention of clogging with ink; a nitrogen-containing cyclic compound or an ether compound of a polyalkylene oxide is preferable in view of image density and ink ejection stability; and use of a lower alkyl alcohol or a surfactant is preferable in view of frequency responsiveness. Accordingly, the preferable composition of the solvent in the present invention contains a main component as above in addition to water.

The content of the above water-soluble organic solvent in the ink is generally in the range of from 2 to 80% by weight, preferably from 3 to 70% by weight, still more preferably from 4 to 60% by weight of the total weight of the ink.

The amount of water to be used is generally in the range of from 10 to 97.5% by weight, preferably not less than 35% by weight, still more preferably not less than 45% by weight of the total weight of the ink. At a less amount of the water, a low-volatile organic solvent remains in a formed image, which undesirably causes problems of migration of the dye, running or feathering of the formed image.

The ink of the present invention may optionally contain a pH-adjusting agent, a viscosity-adjusting agent, a surface tension-adjusting agent, or the like in addition to the components described above. The pH-adjusting agent includes amines such as diethanolamine, triethanolamine, etc.; inorganic alkali salts including hydroxides such as sodium hydroxide, lithium hydroxide, potassium hydroxide, etc.; organic acid salts such as lithium acetate, etc.; organic acids, mineral acids, and the like.

The ink of the present invention desirably has properties of a viscosity at 25° C. within the range of from 1 to 20 cps, preferably from 1 to 15 cps; a surface tension of not less than 30 dyn/cm, preferably not less than 40 dyn/cm; and pH within the range of from 4 to 10.

As the recording method for the ink of the present invention, effective is an ink-jet recording system. As the recording medium therefor, coated paper is effective to obtain an image with high sharpness and high resolution.

The recording medium used in the present invention may be any of mediums including general-purpose ordinary paper (e.g., wood-free paper, medium-quality paper, and bond paper), coated paper, plastic OHP films, and the like. In particular, use of coated paper will achieve considerable effects. The coated paper, which is generally constructed from wood-free paper as the base material and an ink-receiving layer formed thereon composed of a pigment and a binder, includes in the present invention such paper having an ink receiving layer in which paper fibers of the base material exist mixedly in the ink-receiving layer.

The ink of the present invention is especially suitable for an ink-jet recording method wherein ink is ejected by bubbling of ink caused by thermal energy, because the ink has the characteristics of exceedingly high stability of ink ejection and non-occurrence of a satellite dot. For this use, thermal properties of the ink is sometimes adjusted (e.g., specific heat, thermal expansion coefficient, thermal conductivity, etc.).

The ink of the present invention, which is particularly suitably for an ink-jet recording method for recording by ejecting ink droplets by thermal energy, is naturally useful also for general writing utensils.

The methods and the apparatus suitable for the use of the ink of the present invention are those that provide thermal energy to ink in a cell in a recording head in correspondence with recording signals to form liquid droplets by the thermal energy.

Figure 1B:
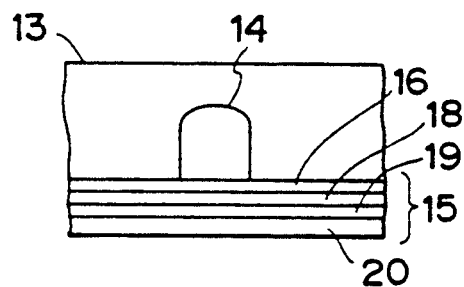
Figure 2:
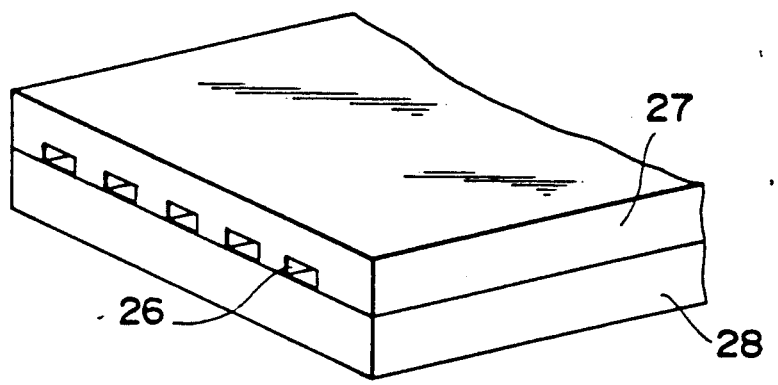
FIG. 2 is an oblique appearance view of a multiple form of the head of FIG. 1.

An example of the constitution of the heads, which is a main portion of the apparatus, is shown in FIG. 1A, FIG. 1B, and FIG. 2.

A head 13 is formed by bonding a plate of glass, ceramics, or plastics having a groove 14 with a heat-generating head 15. (The type of the head is not limited to the one shown in the figure.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having a good heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" on the heat-generation head 15 generates heat to form a bubble in the ink 21 at the position adjacent thereto. The pressure generated by the bubble pushes out the meniscus 23 and ejects the ink 21, as a recording droplets 24, and the ink droplets fly to a recording medium 25. FIG. 2 illustrates an appearance of a multi-head construction by juxtaposing a multiplicity of heads shown in FIG. 1A. The multi-head is prepared by bonding a glass plate having multi-grooves with a heat-generation head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
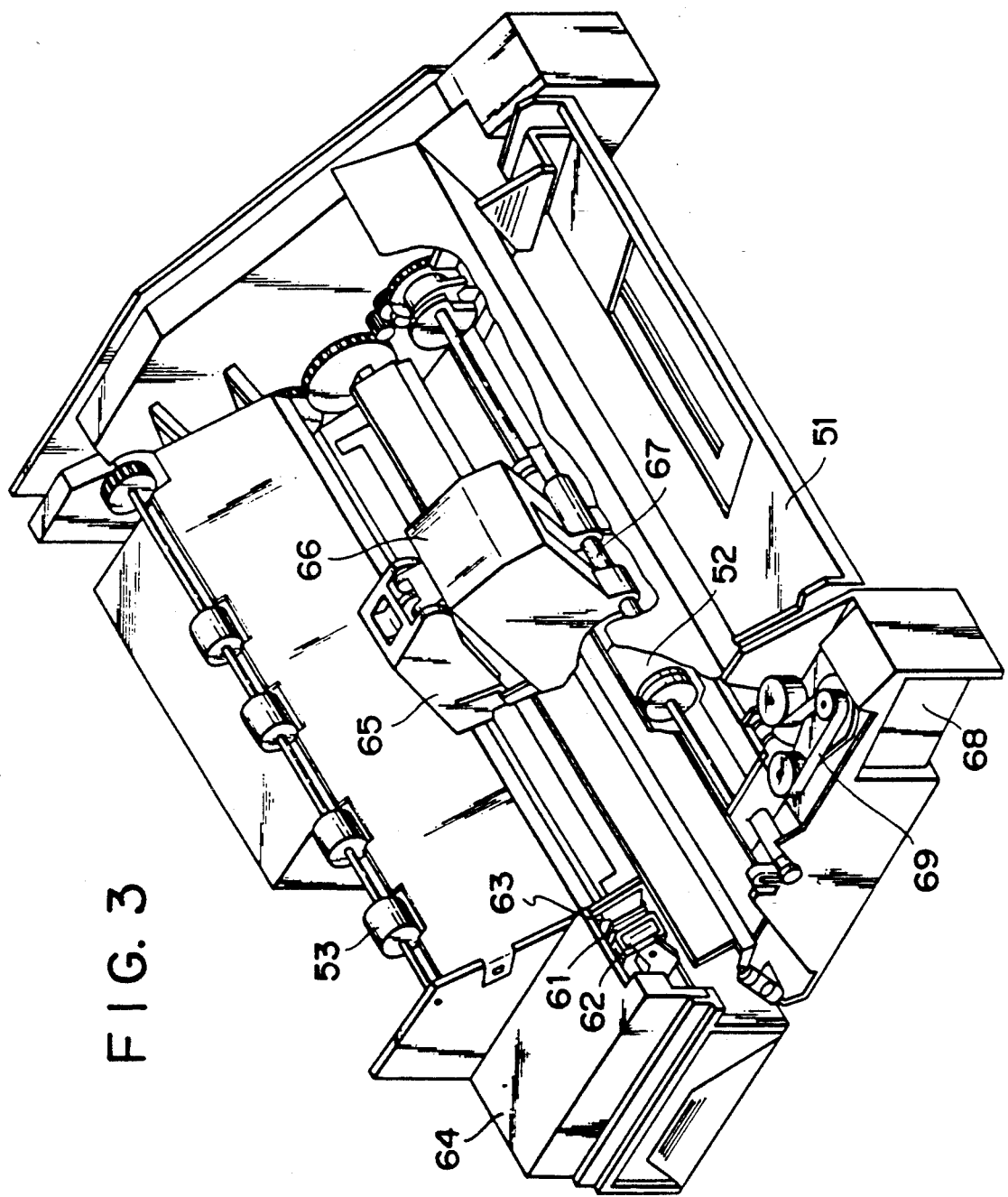
FIG. 3 is an oblique view of an ink-jet recording apparatus.

FIG. 3 illustrates an example of the ink-jet recording apparatus having such a head mounted therein.

In FIG. 3, a blade 61 as a wiping member is held at one end by a blade-holding member. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62 and the absorption member 63 constitute an ejection-recovery section 64, and the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slidably with a guide rod 67. A portion of the carriage 66 is connected (not shown in the figure) to a belt 69 driven by a motor 68, so that the carriage 66 is movable along the guide rod 67 to the recording region of the recording head and the adjacent region thereto.

The constitution of a paper delivery portion 51 for delivery of a recording medium and a paper delivery roller 52 driven by a motor (not shown in the figure) delivers the recording medium to the position opposing to the ejecting nozzle face of the recording head, and the recording medium is discharged with the progress of the recording to paper discharge portion provided with paper-discharge rollers 53.

In the above construction, the cap 62 of the ejection-recovery portion 64 is out of the moving path of the recording head 65, while the blade 61 is made to protrude into the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
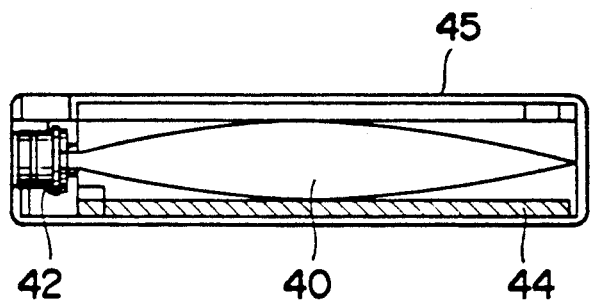
FIG. 4 is a longitudinal cross-sectional view of an ink cartridge.

FIG. 4 illustrates an example of the ink cartridge 45 containing ink to be supplied through an ink supplying member such as a tube (not shown). The ink container portion 40, for example an ink bag, contains an ink to be supplied, and has a rubber plug 42 at the tip. By inserting a needle (not shown in the figure) into the plug 42, the ink in the ink container portion 40 becomes suppliable. An absorption member 44 absorbs waste ink.

The ink container portion preferably has a liquid-contacting face made of polyolefin, especially polyethylene in the present invention.

The ink-jet recording apparatus used in the present invention is not limited to the above-mentioned one which has separately a head and an ink cartridge. Integration thereof as shown in FIG. 5 may suitably be used.

Figure 5:
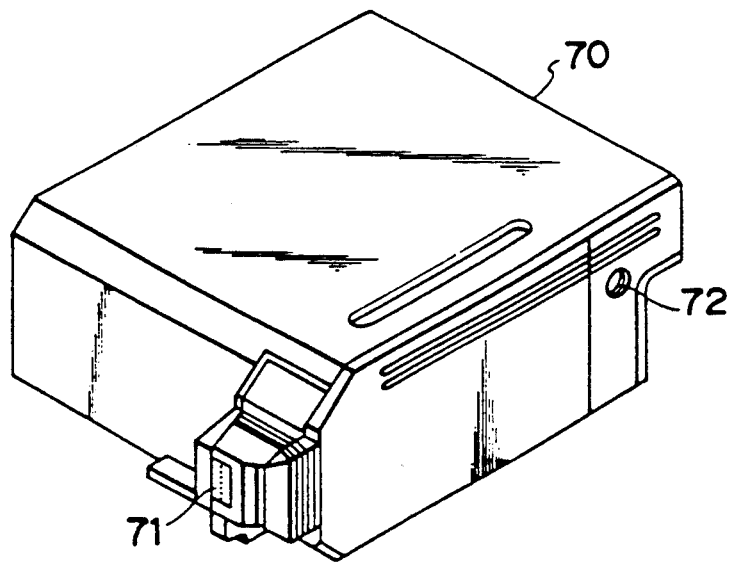
FIG. 5 is an oblique view of a recording unit.

In FIG. 5, a recording unit 70 houses an ink container portion such as an ink absorption member, and the ink in the ink absorption member is ejected from a head 71 having a plurality of orifices. The material for the ink absorption member is preferably polyurethane in the present invention.

Air-communication opening 72 is provided to communicate interior of the cartridge with the open air.

The recording unit 70 may be used in place of the recording head shown in FIG. 3, and is readily mountable to and demountable from the carriage 66.

The present invention is described in more detail referring to examples and comparative examples. The unit "%" in the description is based on weight unless otherwise mentioned. The value of "pH" in the description is a hydrogen ion concentration of a finished recording liquid.

EXAMPLE 1

| Exemplified dye No. 1 | 4% |
|---|---|
| Diethylene glycol | 30% |
| Deionized water | 66% |
| pH 6.5 | |

EXAMPLE 2

| Exemplified dye No. 2 | 3% |
|---|---|
| Diethylene glycol | 20% |
| Polyethylene glycol | 10% |
| (Average molecular weight: 300) | |
| Deionized water | 67% |
| pH 5.1 | |

EXAMPLE 3

| Exemplified dye No. 3 | 3% |
|---|---|
| Diethylene glycol | 15% |
| N-methyl-2-pyrrolidone | 15% |
| Deionized water | 67% |
| pH 8.5 | |

EXAMPLE 4

| Exemplified dye No. 4 | 2% |
|---|---|
| Triethylene glycol | 28% |
| Deionized water | 70% |
| pH 9.4 | |

EXAMPLE 5

| Exemplified dye No. 5 | 3% |
|---|---|
| Diethylene glycol | 20% |
| Ethyl alcohol | 5% |
| Deionized water | 72% |
| pH 7.3 | |

EXAMPLE 6

| Exemplified dye No. 6 | 3% |
|---|---|
| Diethylene glycol | 20% |
| Ethyl alcohol | 5% |
| Deionized water | 72% |
| pH 6.8 | |

EXAMPLE 7

| Exemplified dye No. 8 | 4% |
|---|---|
| Diethylene glycol | 15% |
| N-methyl-2-pyrrolidone | 15% |
| Deionized water | 66% |
| pH 4.9 | |

EXAMPLE 8

| Exemplified dye No. 7 | 4% |
|---|---|
| Diethylene glycol | 30% |
| Deionized water | 66% | pH 6.3

The above-mentioned components were sufficiently mixed and dissolved in a vessel, respectively. The mixtures were filtered under pressure by use of a teflon filter having a pore diameter of 0.22 μm to prepare the inks of the present invention.

The inks above were respectively mounted on an ink-jet printer BJ-130A (made by Canon K. K., nozzle number: 48 nozzles), and solid printing was conducted in a size of 15 mm×30 mm on the recording mediums A, B, and C. Subsequently, the printed matters were left standing for 120 minutes in a dark chamber containing ozone at a concentration of 3±2 ppm for accelerating discoloration. The color differences ΔE*ab brought about by the test were measured (according to JIS S 8730). In every case, the ΔE*ab was not more than 10, giving less discoloration, which was satisfactory.

Recording medium A: Specified paper (coated paper) for ink jet printer (IO-730) made by Sharp Corporation;

Recording medium B: Specified paper (coated paper) for PIXEL PRO made by Canon K. K.);

Recording medium C: Specified paper (coated paper) for Paint Jet made by Hewlett Packard Co.

With the above-mentioned ink and printer, the ink was ejected in an amount corresponding to 1000 sheets of printing in A4 size (1500 letters per sheet), and thereafter printing of alphabets and numerals was conducted on the Recording medium B. As the results, the quality of the print was satisfactory without defect such as blurring and chipping of the alphabets or numerals.

For comparison, the components below were mixed as in the above Examples to prepare inks, and employed for solid printing on the Recording mediums A and B. The printed matter was tested in the aforementioned ozone-containing test chamber in the same manner as above. It was found that in every case, the value of ΔE*ab was 20 or more, giving high degree of discoloration.

COMPARATIVE EXAMPLE 1

C.I. Food Black 2     4%

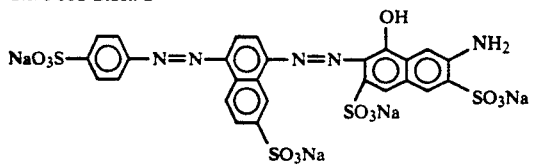

| | |
|---|---|
| Diethylene glycol | 30% |
| Deionized water | 66% |

COMPARATIVE EXAMPLE 2

C.I. Direct Black 51     3%

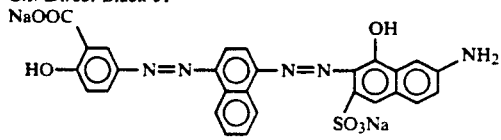

| | |
|---|---|
| Diethylene glycol | 20% |
| Polethylene glycol | 10% |

(Average molecular weight: 300)
Deionized water     67%

COMPARATIVE EXAMPLE 3

C.I. Direct Black 91     3%

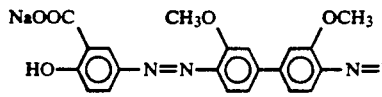

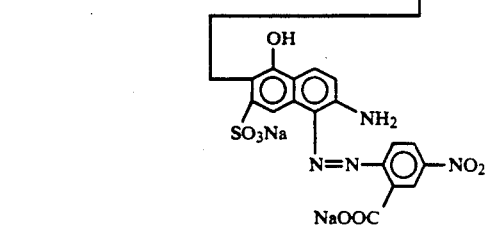

| | |
|---|---|
| Diethylene glycol | 15% |
| N-methyl-2-pyrrolidone | 15% |
| Deionized water | 67% |

The use of the dye represented by the general formula (I) gives an ink which has the properties required for printed matters on ordinary paper and also is capable of giving a less discoloring image on coated paper. Further it gives an image of high image quality with high resolution and less discoloration, and having satisfactory fastness properties.

The ink of the present invention exhibits sufficiently the aforementioned characteristics at the neutral range of pH 4 to 10, which is satisfactory in view of safety because of no need of addition of strongly alkaline substance such as described in Japanese Patent Application Laid-Open No. 56-57862.

Furthermore, the ink of the present invention, even when applied to ink-jet recording method which ejects ink by action of thermal energy, can be used stably for long time without forming an adhering matter on the heater, and does not change its physical properties nor forming no solid deposit during storage.

What is claimed is:

1. An ink comprising a recording agent and a liquid medium for dissolution or dispersion thereof, the recording agent being a compound represented by the general formula

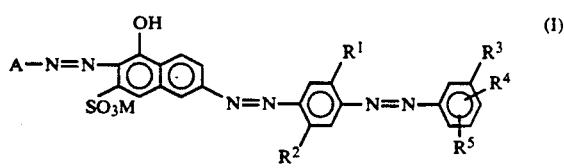

wherein $R^1$ and $R^2$ are respectively a radical selected from the group of lower alkyl, lower alkoxy, —NHCOCH$_3$, —COOM, and —SO$_3$M; $R^3$, $R^4$, and $R^5$ are respectively a radical selected from the group of hydrogen, hydroxyl, lower alkyl, lower alkoxy, amino, —SO$_3$M, and —COOM; A is

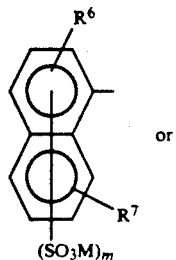

or

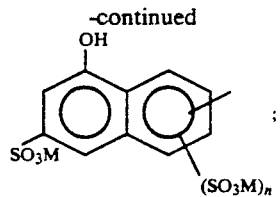

$R^6$ and $R^7$ are respectively a radical selected from the group of hydrogen, hydroxyl, and lower alkoxy; m is 1 or 2; n is 0 or 1; and M is alkali metal or ammonium.

2. The ink of claim 1, wherein a pH value of the ink is within the range of from 4 to 10.

3. The ink of claim 1, wherein the liquid medium comprises a mixed solvent of water and a water-soluble organic solvent.

4. The ink of claim 3, wherein the water is contained in an amount within the range of from 10 to 97.5% by weight of the total weight of the ink.

5. The ink of claim 3, wherein the water-soluble organic solvent is contained in an amount within the range of from 2 to 80% of the total weight of the ink.

* * * * *

UNITED STATES PATENT AND TRADEMARK OFFICE
CERTIFICATE OF CORRECTION

PATENT NO. : 5,082,496  Page 1 of 2
DATED : January 21, 1992
INVENTOR(S) : Yamamoto et al.

It is certified that error appears in the above-identified patent and that said Letters Patent is hereby corrected as shown below:

COLUMN 1:

Line 32, "flowing out" should read --flowing-out--;
Line 45, "system," should read --system--.

COLUMN 2:

Line 5, "light" should read -- light- --;
Line 56, "which" should read --that--.

COLUMN 3:

Line 42, "abovementioned" should read --above-mentioned--.

COLUMN 4:

Line 18, "abovementioned" should read --above-mentioned--.

COLUMN 8:

Line 31, "heat" should read --abruptly heat--;
Line 36, "construction" should read --constructed--.

UNITED STATES PATENT AND TRADEMARK OFFICE
CERTIFICATE OF CORRECTION

PATENT NO. : 5,082,496

DATED : January 21, 1992

INVENTOR(S) : Yamamoto et al.

It is certified that error appears in the above-identified patent and that said Letters Patent is hereby corrected as shown below:

COLUMN 11:

Line 25, "Canon K.K.);" should read --Canon K.K.;--.

COLUMN 12:

Line 43, after "to" insert --an--;
Line 47, "forming no" should read --form any--.

COLUMN 14:

Line 12, "ammonium." should read --ammonium and wherein the recording agent is contained in an amount within the range of from 0.1 to 15 % by weight of the total weight of the ink.--.

Signed and Sealed this

Twenty-second Day of June, 1993

Attest:

MICHAEL K. KIRK

Attesting Officer

Acting Commissioner of Patents and Trademarks